United States Patent Office 2,970,121
Patented Jan. 31, 1961

2,970,121

MOLDING COMPOSITION COMPRISING A NOVOLAC RESIN, A FURAN DERIVATIVE, AND A FILLER, AND PROCESS FOR MAKING SAME

Robert A. Schmittberger, Annandale, N.J., assignor to Union Carbide Corporation, a corporation of New York No Drawing. Filed July 3, 1957, Ser. No. 669,697

13 Claims. (Cl. 260—17.2)

This invention relates to rapid curing molding compositions in which the resinous binder is essentially a condensation product of a phenol and formaldehyde. More particularly, the invention is concerned with molding compositions which can be molded rapidly under a broad range of molding pressures and temperatures and in a variety of molds and presses.

Desirably, a thermosetting, phenolic resin molding composition should exhibit a high degree of molding speed and wide molding latitude and versatility. The commercial presses used for molding such compositions are massive and expensive pieces of equipment; and the ability to increase their productivity, e.g., by decreasing the press cycle, is an economic goad of compelling magnitude which has impelled a constant search for faster curing compositions. The desire for wider "molding latitude" and "versatility," which denote respectively the ability of a given material to be molded satisfactorily over a range of temperatures and pressures and in a variety of molds and presses are inspired by similar motives. Different presses are capable of providing different levels of pressure, temperature, and closing speed; and the ability to mold a specified article in various presses permits better utilization of a molder's equipment and decreases his idle-press time. The ability to use one molding material on a variety of jobs, i.e., to mold therefrom a wide variety of objects ranging from relatively small, simple articles such as a bottle cap or the like to relative large, complex or intricately shaped articles such as radio or television cabinets or construction parts, reduces the number of molding materials which must be inventoried and greatly simplifies the programming, channeling, and material flow problems as when several different articles are being molded in the shop simultaneously.

While numerous methods have been proposed for increasing either the cure speed or the molding latitude of phenolic resin molding compositions, almost invariably, improvements in either of these two properties have been accomplished at the expense of the other. For example, molding compositions containing phenolic novolac resins which are methylene chained phenylols of which a high percentage are ortho chained, namely contain 2,2'-dihydroxydiphenylmethane type structures as described in Bender et al. U.S. Patent 2,475,587 are in many respects the fastest curing phenolic molding compositions presently known; but such materials have very poor molding latitude, i.e., are extremely critical in the presses and can be molded satisfactorily only under carefully controlled conditions of temperature and pressure, and are therefore useful only for certain applications. In particular, they are so fast curing that they frequently set-up or cure before the mold is completely closed, in which instances the mold cavity remains only partially filled-out and a so-called "short," or incompletely formed piece, results.

Modification of molding compositions containing the Bender et al. ortho-methylene chained phenolic resins with a conventional novolac resin, that is, a novolac containing a predominance of para-para and para-ortho phenylol-chaining methylenes, confers somewhat better latitude, but such modified molding compositions still exhibit extremely critical molding behaviors, and their molding speeds are significantly and undesirably reduced.

Although modification of ortho-methylene chained phenolic resins with a conventional phenolic resin as suggested by Bender et al. in U.S. Patent 2,475,587, column 8, lines 41–54, effects some improvement in molding speed, the degree of improvement which can be accomplished in this manner is sharply limited by the concomitant reduction in molding latitude. Thus, the molding speed of a mixed-resin molding composition of this type, i.e., one containing both conventional novolac and ortho-methylene chained phenolic resins, is intermediate that of the corresponding molding materials made with each resin alone and is roughly proportional to the relative amounts of ortho-methylene chained phenolic resin and conventional novolac present therein. Attainment of what is, for all practical intents and purposes, the minimum desirable molding speed requires that the ortho-methylene chained phenolic resin to conventional novolac weight ratio be at least about 1:1; but the molding behaviors of compositions containing such concentrations of resins are so poor as to render them commercially unacceptable as general purpose molding materials.

On the other hand, molding compositions comprising phenolic novolacs of the classical type such as are made by condensing a phenol and an aldehyde in the presence of a strongly acidic catalyst, e.g. hydrochloric and/or oxalic acid, or the like, and which contain only a minor percentage of ortho-methylene chained phenylols exhibit good molding latitude and versatility; but such materials are comparatively slow molding and require uneconomically long press cycles which make them commercially objectionable. Moreover, they are, on this same account, becoming progressively less and less acceptable as the use of automatic molding equipment becomes increasingly widespread.

An object of the present invention is the production of thermosetting phenolic molding compositions having greater molding latitude and versatility than the compositions described in the Bender et al. U.S. Patent 2,475,587.

A further object is the production of molding compositions having superior plasticity characteristics than the known ortho-methylene chained phenolic resin compositions and yet exhibiting substantially equivalent curing speeds and furthermore capable of being molded at least as fast, and in most instances, considerably faster, i.e. with shorter press cycles, than such prior art materials.

A further object is to provide molding compositions having superior hot rigidity and mold release characteristics.

It has now been found that the incorporation of a small amount of a furan derivative and specifically furfural or furfuryl alcohol in a molding composition comprising molding material filler, a resinous binder therefor which is essentially a novolac resin or methylene chained polyphenylol in which a major amount of the phenylol groups are ortho-methylene chained phenylols and a hardener for the novolac such as a methylene group engendering agent such as hexamethylenetetramine imparts to such composition a most satisfactory degree of molding latitude and versatility accompanied by molding speed equivalent to and in many instances even more rapid than an unmodified molding composition containing an ortho-methylene chained novolac.

The salutary results accomplished by the furfural or furfuryl alcohol are quite unexpected in several respects, and the mechanism via which it simultaneously improves several heretofore conflicting properties is not yet fully understood. For example, the effects of the furfural on plasticity and mold closing time suggest that it functions as a plasticizer; but a plasticizer generally effects an overall lessening of rigidity and more often than not increases the tendency of a composition to stick to mold surfaces, whereas the instant furfural or furfuryl alcohol modified compositions exhibit, if anything, greater hot rigidity and better mold release behaviors than their furfural and furfuryl alcohol-free counterparts.

Alternatively, these apparently contradictory plasticity-rigidity-mold release behaviors can be reconciled, at least to some extent, if the furfural or furfuryl alcohol is regarded as a "reactive plasticizer," i.e. a material which acts, in its native state, as a plasticizer, then reacts with and becomes chemically combined into the composition during molding, and hence no longer contributes any plasticizing action. This interpretation, however, leaves the fast curing attributes particularly surprising in view of the fact that phenol-furfural resins such as are obtained by chemically reacting phenol and furfural together are notoriously much slower curing than even conventional phenol-formaldehyde resins.

In general, the novel molding compositions of this invention comprise by weight from about 20 to about 68 percent and preferably about 30–45 percent of novolac resin of which at least half and preferably at least about three-fifths by weight is an ortho-methylene chained novolac resin; an appropriate amount of a suitable hardener for said resin, as described hereinafter; from about 70 to about 30 percent, and preferably about 50 to 30 percent, of a reinforcing filler; and from about 1 to about 7 percent, but preferably about 2.5 to 4.5 percent, of furfural or furfuryl alcohol; and wherein said components are substantially homogeneously distributed.

The terms "novolac" and "novolac resin" denote a condensation product such as is obtained by causing a phenol to condense with less than an equimolar proportion of an aldehyde or a ketone, generally in an acidic environment. Structurally, the molecules of a novolac consist essentially of alkyl substituted or unsubstituted phenylol nuclei connected together by methylene or substituted methylene links. The terms "ortho-methylene chained phenolic resin" and "ortho-methylene chained novolac" as used herein denote a novolac wherein a majority of said phenylol-connecting links are of the 2,2'-dihydroxydiphenylmethane configuration, that is, are ortho-ortho methylene groups, namely methylene groups attached at each end to an ortho position of a phenylol group, as for example, the phenol-formaldehyde condensates having an ultimate bromine number less than 55 described by Bender et al. in 2,475,587.

Those agents generally used as novolac resin hardeners are suitable as hardeners in the instant compositions. These include methylene or substituted methylene engendering agents such as hexamethylenetetramine (commonly called "hexa"), para-formaldehyde, ethylenediamine-formaldehyde adduct, one-step phenol-aldehyde resins (or "resoles") and the like. The amount of hardener used depends on, inter alia, the particular hardener and composition involved and the particular balance of composition and end-product properties desired. Thus, good results can be obtained with from about 0.10 to about 0.33 part by weight of "hexa," or with from about 0.3 to about 1 part one-step resin per part of ortho-methylene chained phenolic resin, when each of said materials is used as the sole hardening agent; but lesser concentrations may frequently be used advantageously when said hardeners are used conjointly or in combination with other hardening agents.

Hexamethylenetetramine, particularly in concentrations of about 0.13 to 0.29 part per part by weight of the ortho-methylene chained novolac resin, is the preferred hardener because it provides the optimum balance of molding latitude, rigidity of the hot molding and minimum time required to attain a blister-free molding.

As the hexamethylenetetramine content is increased above about 0.10 to 0.15 part per part ortho-methylene chained novolac, the time to attain a blister-free piece (called the "minimum blister-free time" or MBFT) increases, but the hot rigidity and molding latitude are progressively improved. Thus, about 0.20 part hexamethylenetetramide per part by weight of ortho-methylene chained novolac provides the best overall balance for a general purpose molding material; but a greater or less hexamethylenetetramine concentration within the above-cited limits may be preferred for specific applications wherein either greater degrees of hot rigidity and latitude or faster minimum blister-free times, respectively, are of relatively greater importance.

The molding material filler may be organic or inorganic and may be of natural or synthetic origin. Illustrative of materials suitable as fillers are wood flour, cotton flock, rag, alpha pulp, cork, lignin, synthetic thermoplastic resin fibers, solid or hollow particles of cured thermosetting resin, silica, silicates, clays, and the like. Wood flour is the preferred filler for general purpose compositions because of the favorable density, machine-ability characteristics, preformability, strength properties and other attributes provided thereby and because of its ready availability and low cost. However, other fillers such as mica, asbestos, glass fibers, and the like are indicated for specialized applications in which relatively higher levels of electrical properties or thermal resistance or some other particular property or properties are required.

The molding compositions may, and preferably do, contain about 0.25 to 10 percent by weight of the overall composition of an alkaline modifier such as the oxide or hydroxide of an alkaline earth metal as for example magnesium oxide and lime, the latter being particularly preferred. These modifiers act as curing accelerators and improve the hot rigidity and appearance, particularly surface gloss, of the molded article.

Additionally, small amounts of lubricants, colorants, mold release agents, and other modifiers such as are generally used in phenolic resin molding compositions may also be included. For example, long chain fatty alcohols and acids and salts thereof, natural and synthetic waxes, and the like are suitable as lubricants, and are generally employed to best advantage in amounts not exceeding about 3 percent by weight of the overall composition.

The substantially uniform distribution within the composition of the ortho-methylene chained phenolic resin, hardener, filler and furfural or furfuryl alcohol with respect to each other is of critical importance. For convenience, the reason and methods for achieving satisfactory distribution will be described with respect to furfural, but it should be understood that the same apply equally to furfuryl alcohol.

Furfural appears to wet particles of ortho-methylene chained novolac very rapidly, causing them to become extremely tacky and to form large agglomerates which stubbornly resist dispersion and prevent proper mixing of the composition. The furfural-novolac resin affinity is apparently so strong and the resultant tackifying and agglomerating effect occurs so rapidly as to prevent satisfactory processing even when the resin and furfural are present in a dry mix containing appreciable proportions of inert, dry filler, which might be expected to function as a diluent and separating medium. For instance, when the powdered resin, hardener, lubricants, and other modifiers, and wood flour filler are charged, in that order, to a ball mill and the furfural, which has been premixed with a small portion of the wood flour to form a dry-appearing, free flowing mixture, is then added and the overall mixture milled, the resin apparently abstracts the furfural from the wood flour. Large, tacky agglomerates form, and "plate-out" as tenaciously adherent deposits which build up on the balls and mill wall. Continued milling does not dislodge and disperse these deposits, but only appears to increase and compact them and further aggravates the situation.

However, if the furfural is pre-mixed with a sufficient proportion of the wood flour, of the order of 2.5 times or more its own volume, which amount of wood flour generally corresponds to about 10 percent or more by weight of the overall molding material composition, and this pre-mix is then added to the remaining components of the composition, satisfactory pre-blending of the overall composition can be achieved in a tumbling type or other mixer which generates little or no heat within the mass, and the mixture so prepared can be roll milled, or otherwise hot-processed into a good quality molding material.

The molding compositions of this invention can be prepared by any of the many known methods for mixing and compounding the components of a phenolic molding composition, provided the furfural is introduced at such a stage in the process and in such manner as to insure its adequate dispersion. Thus, the furfural can be incorporated satisfactorily during a hot compounding, fluxing, or densifying operation such as is usually accomplished with a two-roll mill, Banbury mixer, compounding or mixing extruder, or the like; or it may be incorporated satisfactorily during a dry mixing or blending operation such as is usually accomplished in a tumbling type blender, paddle mixer, or the like, if it is first adsorbed onto a suitable agent or otherwise prevented from causing the formation of agglomerates or other gross, non-dispersible inhomogeneities.

For example, the furfural can be adsorbed onto a small amount of a silica or silicate or adsorbing carbon, such as are available commercially from many suppliers, e.g., "Micro-Cel E," a finely divided hydrate calcium silicate marketed by Johns-Manville, or "Cab-O-Sil," a finely divided silica marketed by Godfrey L. Cabot, Inc., or the like, to form a dry, free flowing, powdery material containing the desired concentration of furfural. Appropriate proportions of the so-adsorbed furfural can then be mixed with the remaining components of the molding composition and compounded therewith by any of the well known processes. For example, the mixture may be blended in a tumbling type mixer, then fluxed, sheeted, and rolled on a two-roll mill; and the resultant roll sheet can then be cooled and reduced to the desired particle size.

In molding compositions containing as filler wood flour or other organic material, the amount of siliceous adsorbent is desirably kept to a minimum since excessive amounts thereof tend to unfavorably affect the preformability of the composition and the specific gravity and machinability of the articles molded therefrom. In such compositions, the concentration of siliceous adsorbent is desirably not more than about 5 percent, and preferably does not exceed about 2 percent by weight of the overall.

Alternatively, the dry components of the composition may be blended to form a uniform mixture and said mixture may be fed into a compounding extruder wherein it is fluxed, mixed and compacted. The furfural or furfuryl alcohol can be metered directly into the fluxed mass within the barrel of the extruder; and adequate mixing and dispersion accomplished therein as the overall mixture progresses through the extruder barrel to the outlet. The extruder composition, conveniently in the form of short, spaghetti-like strands, can then be cooled and reduced to the desired particle size.

The furfural or furfuryl alcohol can be incorporated into and satisfactorily dispersed through the composition in a Banbury mixer or heated kneader or the like.

Still another mixing procedure is the direct addition of the furfural to the novolac resin immediately prior to its being discharged from the still or reaction vessel in which it was prepared. After cooling, said furfural-containing resin can be readily comminuted and compounded into a molding material. This procedure provides somewhat less cure speed than that of incorporating the furfural into the molding material mixture, but is, nevertheless, preferred in the production of brown and certain other colored molding mixtures which tend to display unwelcome degree of mottled color effects in the molded articles when the furfural is added to the molding mixture as previously described.

From the foregoing, other suitable methods of introducing the furfural or furfuryl alcohol and of insuring their satisfactory distribution will be readily apparent to those familiar with the art.

The following examples will serve to illustrate the practice of the the invention. All parts and percentages are by weight, except where otherwise indicated.

EXAMPLES 1A, 1B AND 1C

Preparation of furfural pre-mix

Wood flour, finely divided calcium silicate (Johns-Manville's "Micro-Cel E") and furfural, in the proportions shown in subsequent Table I-A were charged in that order into a cylindrical blender and blended 30 minutes at room temperature to form a substantially homogeneous, dry-appearing, powdery, free-flowing pre-mix, which was set aside for subsequent use.

Preparation and properties of molding compositions

Each of the mixtures whose composition is shown in Table I-A was processed in the following manner. The components listed were charged, in that order, into a cylindrical blender and blended 30 minutes to form a substantially uniform, agglomerate-free mixture. Said mixture was fluxed, sheeted, and rolled for 80 seconds on a two-roll mill whose front and back rolls were maintained at 80° C. and 150° C. respectively. The roll sheet was cooled and granulated to pass through a 12 mesh screen. The properties of the molding compositions so prepared and of molded pieces made therefrom are summarized in Table I-B in which Examples 1A, 1B, and 1C are illustrative of the invention and formulations D, E, and F illustrate respectively an "ortho" novolac composition free from furfural, a conventional novolac with furfural and a conventional novolac free from furfural.

Preparation of ortho-methylene chained novolac

A mixture consisting of 3 moles of phenol and 2 moles of 37 percent aqueous formaldehyde was adjusted to pH 5 by the addition of a small amount of zinc oxide, then heated to 100° C., refluxed at atmospheric pressure for 2¼ hours, cooled to about 40° C. and vacuum dehydrated (pressure about 75 mm.) to a pot temperature of 80° C. Vacuum was released and distillation was continued at atmospheric pressure until the mass temperature reached 130° C. The reaction mixture was maintained at 130–140° C. for one hour; the residual water and unreacted phenol were distilled off, first at atmospheric pressure then under vacuum (pressure about 75 mm.) to a pot temperature of 160° C., and the product was discharged, cooled, and comminuted to a fine powder. In the subsequent examples, this resin for brevity purposes is identified as "ortho" novolac resin.

Preparation of conventional strong-acid-catalyzed novolac containing mostly para-para and ortho-para phenylol-chaining methylenes A mixture consisting of 5 moles of phenol and 4 moles of 37 percent aqueous formaldehyde was acidified to a pH of 1 with oxalic acid, then heated to 100° C. and refluxed until the reaction mixture contained substantially no free formaldehyde. The reaction mixture was neutralized with lime; the volatiles were distilled off at atmospheric pressure to a pot temperature of 150° C.; and the product was discharged, cooled, and comminuted to a fine powder. In the subsequent formulations and examples this resin, for purposes of brevity, is referred to as conventional novolac resin.

TABLE 1-A

|  | Example 1A | Example 1B | Example 1C | Formulation D | Formulation E | Formulation F |
|---|---|---|---|---|---|---|
| Composition of Furfural Pre-Mix: |  |  |  |  |  |  |
| Wood flour | 0.5 | 0.5 | 0.5 | --- | 0.5 | --- |
| Calcium silicate | 1.2 | 1.2 | 1.2 | --- | 1.2 | --- |
| Furfural | 4.0 | 2.0 | 1.0 | --- | 4.0 | --- |
|  | 5.7 | 3.7 | 2.7 | 0 | 5.7 | 0 |
| Composition of Molding Material Mixture: |  |  |  |  |  |  |
| "Ortho" novolac resin | 38.0 | 40.0 | 42.0 | 47.0 | --- | --- |
| Conventional novolac resin | --- | --- | --- | --- | 38.0 | 43.7 |
| Hexamethylenetetramine | 7.5 | 7.9 | 8.3 | 8.15 | 7.5 | 8.6 |
| Lime | 4.0 | 4.0 | 4.0 | 4.0 | 4.0 | 4.0 |
| Mold lubricant | 1.4 | 1.3 | 1.3 | 1.3 | 1.4 | 1.4 |
| Nigrosine | 2.0 | 2.0 | 2.0 | 2.0 | 2.0 | 2.0 |
| Wood flour | 41.4 | 41.1 | 39.7 | 37.55 | 41.4 | 40.3 |
| Furfural pre-mix | 5.7 | 3.7 | 2.7 | --- | 5.7 | --- |
|  | 100.0 | 100.0 | 100.0 | 100.0 | 100.0 | 100.0 |

TABLE 1-B

|  | Example 1A | Example 1B | Example 1C | Formulation D | Formulation E | Formulation F |
|---|---|---|---|---|---|---|
| Powder Properties: |  |  |  |  |  |  |
| Apparent Density (g./cc.) | 0.50 | 0.49 | 0.50 | 0.48 | --- | --- |
| Pourability (sec.) | 22 | 24 | 24 | 22 | --- | --- |
| Plasticity: |  |  |  |  |  |  |
| Flow at 150° C. (inches at 500 p.s.i.) (Rossi-Peakes) | 1.24 | 1.23 | 1.30 | 1.30 | 1.40 | [1](1.20) |
| Minimum Load to Fill (Kilopounds) | 8.45 | 8.35 | 8.85 | 8.90 | 6.4 | 5.05 |
| Cup Closing Time at 20,000 lbs. (sec.) | 6.2 | 7.3 | 7.2 | 7.7 | 5.9 | (6.7) |
| Molding Properties: |  |  |  |  |  |  |
| Latitude by cup test | −2.8 | −2.6 | −2.4 | −6.0 | +1.4 | −0.5 |
| Minimum Blister-Free Time (sec.)— |  |  |  |  |  |  |
| at 305° F | 77 | 77 | 78 | [2] | 115 | 115 |
| at 335° F | 58 | 59 | 61 | 63 | 90 | 92 |
| at 365° F | 54 | 54 | [2] | [2] | 73 | 77 |
| Cap Closing Time (sec.)— |  |  |  |  |  |  |
| at 305° F | 3.5 | 4.8 | 5.0 | 5.2 | --- | --- |
| at 335° F | 3.0 | 3.8 | 4.0 | 4.2 | --- | --- |
| at 365° F | 2.2 | 3.0 | 3.2 | 3.2 | --- | --- |
| Flexibility at 335° F. (mils)— |  |  |  |  |  |  |
| 30″ cure | 75 | 90 | 80 | 88 | [3] | [3] |
| 40″ cure | 45 | 40 | 43 | 50 | [3] | [3] |
| 60″ cure | 30 | 28 | 30 | 33 | 240 | 240 |
| 90″ cure | 25 | 28 | 29 | 30 | 122 | 98 |
| 120″ cure | 28 | 28 | 28 | 31 | 60 | 62 |
| Mold Release | v. good | good | good | fair-good | good | (fair) |
| Shrinkage (mils/in.) | 4.6 | 4.0 | 4.4 | 4.2 | --- | --- |

[1] At 300 p.s.i., i.e., much softer than A–E, therefore properties which are plasticity dependent (shown in parentheses) should not be compared to A–E.
[2] Porous pieces, i.e., could not be molded satisfactorily at this temperature.
[3] Blistered, i.e., incompletely cured.

The compositions of this invention as illustrated by Example 1C, Example 1B, and Example 1A contain progressively greater amounts of furfural respectively 1, 2 and 4 percent by weight of the total compositions. Formulations D, E and F are controls included for comparison. D is a furfural-free counterpart of Example 1A, Example 1B, and Example 1C. E and F are respectively furfural-containing and furfural-free analogues based on a conventional novolac of the classical, strong acid catalyzed variety, rather than an ortho-methylene chained phenolic resin.

The compositions described in Table I-A and Table I-B, excepting F, have substantially the same plasticity, as is evidenced by their similar Rossi-Peakes flows. Accordingly, their properties can be compared directly. Formulation F, however, is significantly softer than the others; and its cup closing time and mold release characteristics, which are plasticity dependent, cannot therefore be compared directly to the other compositions. All other things being equal, cup closing time decreases and mold release becomes poorer with increasing plasticity. The remaining properties of compound F, which are substantially independent of plasticity, can be compared directly.

It can be seen from the results I–B that:
(1) Examples 1C, 1B, and 1A, while not equal to the molding latitude of formulations E and F, nevertheless provide much greater molding latitude than D, as reflected by both the cup test and their behaviors in the minimum blister free test. In the cup test, greater latitude is indicated by an algebraically greater, i.e., more positive number. In the MBFT test, formulation D molded satisfactorily only at 335° F.; Example 1C which contained 1 percent furfural, gave satisfactory moldings at both 305 and 335° F.; and Examples 1B and 1A, which contained 2 and 4 percent furfural, respectively, yielded good moldings at all three test temperatures.

In this same regard, it should be noted that Example 1A and similar compositions containing of the order of 3.5 to 4 percent by weight of furfural have been molded satisfactorily in commercial, automatic presses at temperatures as high as 425° F.

(2) Examples 1C, 1B, and 1A are very much faster molding than formulations E and F, as is evidenced by their shorter minimum blister-free times and greater hot rigidities (lesser flexibility at 335° F.). Moreover, they are significantly faster than formulation D when compared at the same molding temperature; and are, of course, much faster than formulation D when one takes into account their still greater speed at the higher temperatures at which they, unlike formulation D, can be molded.

(3) Examples 1C, 1B, and 1A, as a group, possess somewhat better mold release than the control formulation D; and increasing furfural content appears to confer progressively greater improvement in this respect.

(4) Cup closing and cap closing times of the new compositions are shorter than that of the control formulation D, with increasing furfural contents conferring progressively greater closing speeds.

(5) The hot rigidity (i.e. absence of flexibility at 335° F.) of Examples 1A, 1B, and 1C, and formulation D all being based on an ortho-methylene chained phenol novolac is vastly superior to that of formulations E and F, which are based on a conventional novolac. The latter, even when cured three times as long, do not develop the same degree of hot rigidity as the former; and among the "ortho" novolac resin compositions, Examples 1C, 1B and 1A are, if anything, slightly better than control formulation D.

(6) Other properties of the new compositions such as apparent density, pourability, shrinkage, and the like, are substantially the same as those of the prior art compositions, as are their strength characteristics and electrical properties.

EXAMPLE 2

A mixture consisting of the following:

| | Parts by weight |
|---|---|
| "Ortho" novolac resin | 15.75 |
| Conventional novolac resin | 15.75 |
| Hexamethylenetetramine | 5.13 |
| Magnesium oxide | 1.3 |
| Red dye [1] | 1.0 |
| Burnt umber | 1.0 |
| Boric acid | 3.0 |
| Carbon black | 0.17 |
| Calcium stearate | 1.0 |
| Calcium carbonate | 3.4 |
| Lignin | 15.0 |
| Wood flour | 33.5 |
| Furfural | 4.0 |

[1] American Cyanamid's "Oil Scarlet ZBL."

was charged, in the order listed, into a cylindrical blender and blended 30 minutes to form a substantially uniform, agglomerate-free mixture, which was then fluxed, rolled, sheeted, and granulated substantially as described in the previous examples. The molding composition so prepared exhibited very good molding latitude, mold closing, and molding speed behaviors, as evidenced by the following test results:

| | |
|---|---|
| Latitude, by cup test | +1.8 |
| Cup closing time sec | 3.3 |
| Minimum blister-free time (molded, with 10% overcharge, at 325° F. under a total mold load of 4 tons) sec | 72 |

Such a composition is attractive for a great many molding applications because of its good latitude and molding speed. The strength properties of the moldings, however, while acceptable for many applications, do not meet those necessary for applicants requiring optimum strength characteristics.

EXAMPLE 3

Three molding compounds consisting respectively of:

| | Parts by Weight | | |
|---|---|---|---|
| | Compound A | Compound B | Compound C |
| "Ortho" Novolac Resin | 39.0 | 26.0 | 28.0 |
| Powdered Resole Resin | 13.0 | 26.0 | 28.0 |
| Hexamethylenetetramine | 3.5 | 3.5 | |
| Lime | 8.0 | 8.0 | 6.0 |
| Stearic Acid | 1.0 | 1.0 | 0.7 |
| Zinc Stearate | 1.0 | 1.0 | 1.0 |
| Nigrosine | 2.0 | 2.0 | 2.0 |
| Wood Flour | 30.5 | 30.5 | 32.3 |
| Furfural | 2.0 | 2.0 | 2.0 | were blended and compounded into molding materials substantially as described in the previous example. Said compositions were fast molding and gave recessed bottle caps of good quality and appearance at all three temperatures tested, i.e., 305°, 335°, and 365° F. and displayed the following minimum blister-free times:

| | Minimum Blister-Free Time (sec.) | | |
|---|---|---|---|
| | Compound A | Compound B | Compound C |
| 305° F | 91 | 92 | 92 |
| 335° F | 67 | 72 | 72 |
| 365° F | 58 | 58 | 62 |

It can be seen from the foregoing that the furfural-modified "ortho" novolac resin molding compositions of this invention can be hardened satisfactorily with a one-step resin (resole) and a small amount of hexamethylenetetramine (compounds A and B) or solely by a resole (compound C); and that such compositions provide good molding latitude; and that, albeit not as fast-molding, particularly at low molding temperatures, as are the furfural-modified "hexa"-hardened, ortho-methylene chained phenol resin compositions illustrated by compounds A through C of Example 1, they are significantly faster than novolac resin molding compositions such as exemplified by compounds E and F of Example 1.

The powdered resole resin used in compounds A, B, and C of Example 3 was prepared as follows:

A mixture consisting of 100 parts of phenol, 150 parts of 37 percent aqueous formaldehyde and 3 parts of barium hydroxide octahydrate was vacuum refluxed at 80° C. for 2½ hours; the reaction mixture was then neutralized to a pH of 3.5 with 75 percent phosphoric acid, 5.5 parts hexamethylenetetramine was added, and the mixture was vacuum dehydrated (pressure ca. 100 mm.) to a pot temperature of 90° C. and held at that temperature for an additional 45 minutes. The resinous product was discharged into shallow pans, cooled to room temperature as quickly as possible, and ground to a fine powder, which had a 150° C. hot plate gel time of about 80 seconds.

EXAMPLE 4

A mixture consisting of:

| | Parts by weight |
|---|---|
| "Ortho" novolak resin | 39.0 |
| Hexamethylenetetramine | 7.8 |
| Magnesium oxide | 2.0 |
| Calcium carbonate | 12.55 |
| Red dye | 0.3 |
| Zinc sulphide | 0.35 |
| Calcium stearate | 1.0 |
| Wood flour | 30.0 |
| Furfural | 7.0 | was blended and compounded in substantially the same manner as in Example 2. The molding compositions so prepared exhibited excellent molding latitude, i.e., gave fully satisfactory moldings at molding temperatures ranging from 305° F. to 365° F. and good molding speed, as reflected by a minimum blister-free time of 69 seconds at 335° F.

EXAMPLE 5

A mixture consisting of:

| | Parts by weight |
|---|---|
| "Ortho" novolak resin | 40.3 |
| Hexamethylenetetramine | 6.7 |
| Magnesium oxide | 1.3 |
| Calcium stearate | 1.0 |
| Red dye | 2.5 |
| Burnt umber | 1.0 |
| Carbon black | 0.1 |
| Calcium carbonate | 12.6 |
| Boric acid | 1.8 |
| Wood flour | 30.0 |
| Furfural | 2.7 | was blended and compounded in substantially the same manner as in Example 2. This compound when molded in the recessed bottle cap mold gave caps of excellent appearance and quality and was very fast curing as shown by minimum blister-free times of 77.0 and 60.0 seconds at molding temperatures of 305° F. and 335° F. respectively. A further indication of the fast molding speed of this compound and of its exceptionally great hot rigidity was apparent in the flexibility test in which a deflection of only 0.08 inch was observed after 60 seconds' cure at a molding temperature of 320° F.

EXAMPLE 6

An "ortho" novolac resin/furfural pre-mix was prepared by reacting phenol and formaldehyde and then removing volatiles from the resultant "ortho" novolac resin substantially as described in conjunction with Example 1; then mixing 9.5 parts furfural per 90.5 parts resin into the so prepared "ortho" novolac resin prior to its discharge from the still. The mixture was then discharged and cooled, and was readily ground to a free flowing powder. A mixture consisting of 38 parts of said pre-mix (i.e. 34.4 parts "ortho" novolac resin and 3.6 parts furfural), 5 parts conventional strong-acid-catalyzed novolac resin, 11 parts hexamethylenetetramine, 6 parts lime, 0.7 part stearic acid, 1 part calcium stearate, 4.5 parts iron oxide, 0.5 part red dye, and 33.3 parts wood flour was blended and compounded into a molding material substantially as described in Example 2. The molding composition so prepared exhibited good molding latitude and fast molding characteristics, as shown by the following test results:

Cup closing time _____ sec__ 4.0
Minimum load to fill _____ kilopounds__ 7.1
Minimum blister-free time:
    At 305° F _____ sec__ 82
    At 335° F _____ sec__ 64
    At 365° F _____ sec__ 60

All of the test moldings were of fully satisfactory appearance and quality.

EXAMPLE 7

A substantially uniform dry-mix was prepared by blending 40 parts "ortho" novolac resin, 9.3 parts hexamethylenetetramine, ½ part lime, ¼ part stearic acid, ¼ part calcium stearate, 1.8 parts nigrosine, and 43.9 parts wood flour together for ½ hour in a cylindrical blender. This dry mixture and 4 parts furfural were then mixed together and compacted in a 2-inch diameter compounding extruder having an effective barrel length of 20.75 inches and processed into a molding material in the following manner. Oil from a constant temperature (100° C.) source was circulated through the extruder barrel jacket. The dry mix was fed to the extruder inlet and the furfural was metered uniformly into the hot fluxed mass in the extruder barrel at a point approximately 3 inches ahead of the extruder outlet at rates such that the overall mixture, which attained a temperature of about 110° C. within the extruder barrel, progressed through the mixing extruder at a rate of about 85 lbs. per hour. The extrudate was then cooled and granulated to pass through a 12 mesh screen. The molding composition so prepared exhibited good molding latitude and fast molding characteristics as shown by the following test results:

Minimum load to fill _____ kilopounds__ 8.7
Minimum blister-free time:
    At 305° F _____ sec__ 82
    At 335° F _____ sec__ 61
    At 365° F _____ sec__ 55

All of the test moldings were of fully satisfactory appearance and quality.

EXAMPLE 8

One half part wood flour, 1.2 parts finely divided calcium silicate (Johns-Manville's "Micro-Cel E") and 4.0 parts furfuryl alcohol were charged, in that order, into a cylindrical blender and blended 30 minutes to form 5.7 parts of a substantially homogeneous, dry-appearing, powdery, free-flowing pre-mix which was set aside for subsequent use. A mixture consisting of 38 parts of "ortho" novolac resin, 7.5 parts hexamethylenetetramine, 4 parts lime, 1.4 parts mold lubricant, 2 parts nigrosine, 41.4 parts wood flour, and 5.7 parts of the aforedescribed pre-mix was charged, in that order, into a cylindrical blender and blended 30 minutes then fluxed, sheeted and rolled on a two-roll mill, cooled and ground as described in Example 1. The molding material so prepared had to following properties:

Minimum load to fill _____ 7.45 kilopounds.
Cup closing time _____ 5.7 sec.
Molding latitude, by cup test _____ −2.6.
Minimum blister-free time:
    At 305° F. _____ 85 sec.
    At 335° F. _____ 67 sec.
    At 365° F. _____ 58 sec.
Mold release _____ Good to very good.

All of the test moldings were of fully satisfactory appearance and quality.

*Description of test methods*

"Flow (or Rossi-Peakes flow)" is the height, in inches, to which the material flows when a preformed, 0.375-inch diameter x 0.330-inch high, cylindrical tablet thereof is extruded into a vertical capillary of specified dimensions at 150° C. under a driving pressure of 500 p.s.i., as measured with a Rossi-Peakes flow tester such as described in U.S. Patent No. 2,066,016.

"Minimum load to fill" is the total load needed to mold a prescribed cup with a flash thickness of 10 mils. The cup dimensions and mold design are substantially similar to those described in ASTM D-731 test procedure. The value, in kilopounds, is determined by molding a series of cups at 325° F. under various pressure using a 10 percent powder weight overcharge (i.e., the weight of molding material granules charged into the mold was 10 percent greater than the weight of the molded, flash-free piece); measuring the flash thickness at each pressure; plotting flash thickness vs. mold load; then reading from said curve the total mold load corresponding to a flash thickness of 10 mils.

"Cup closing time" is the interval, in seconds, between the time the mold is 1.00 inch short of full closure and the time the mold is 0.050 inch short of full closure when a cup such as used in the minimum load to fill test is molded at 325° F. under a total mold load of 10 tons using a 10 percent powder weight overcharge.

"Cup test for molding latitude" provides a numerical value which is substantially independent of the molding speed and plasticity characteristics of the material and which has been found, empirically, to correlate well with the ability of the material to be molded satisfactorily in various molds and pressures and under a variety of molding conditions, with algebraically greater, i.e. more positive, numbers reflecting greater latitude. The value is determined in the following manner:

The minimum load to fill is determined by the above-described procedure. Additional cups are then molded, in the same mold and at the same temperature (325° F.) and charge weight, at various pressures and the minimum load needed to produce a fully satisfactory, non-porous cup is established, to the nearest ¼ kilopound. A so-called non-porous cup is one completely devoid of cracks, crevices, dimples, dull-looking blotches, or other surface imperfections such as appear when the mold is not completely and properly filled out by the material being molded. Porosity reflects the inability of the material to be molded satisfactorily in the given mold at the particular temperature and pressure employed, i.e., it cannot be eliminated by prolonging the cure time, but requires, if satisfactory pieces are to be obtained, that the molding temperature and/or pressure be changed. The minimum load to produce a fully satisfactory, non-porous cup is then subtracted from the minimum load to fill, and the difference so obtained is referred to as the cup latitude. Obviously, said value may be either positive or negative, respectively as the minimum load to fill exceeds or is less than the minimum load to yield a non-porous cup.

"Minimum blister-free time (MBFT)" is the time required, in seconds, to compression mold in a specified flash type recessed cap mold, a threaded, cylindrical bottle cap of prescribed dimensions to form a 5 mils high blister on the cap dome plug. The cylindrical cavity of the test mold is 28 mm. in diameter by about 1 3/16 inches deep; and the threaded mold force contains a substantially cylindrical, 7/16-inch diameter by 1/2-inch deep recess centrally located in its flat face-surface. The molded cap, therefore, contains, as an integral portion thereof, a corresponding 7/16-inch diameter by 1/4-inch thick solid, cylindrical, inwardly projecting "plug" located centrally in the crown of the cap, and the blister, if any is localized on the circular flat surface of said plug. A series of such caps is molded at the selected molding temperature using progressively different cure times and, except where otherwise indicated, a 5 percent powder weight overcharge and a total mold load of 6 tons. Each cap is cooled 1/2 hour and the height of the blister, if any, is carefully measured to the nearest half mil. A curve of blister height vs. cure time is then plotted and the time corresponding to a blister height of 5 mils is read from this curve.

"Flexibility' is the distance, to the nearest thousandth of an inch, through which a 4-inch diameter x 0.08-inch thick circular disc is deflected when a specified load, 2126 grams is impressed thereon exactly 10 seconds after completion of the molding cycle and while said disc is still substantially at the molding temperature. A 4-inch diameter x 0.08-inch thick disc is molded for a prescribed time at 335° F. and under a pressure of 2500 p.s.i. in a single cavity, positive, semi-automatic disc mold equipped with knock-out pins. The disc is then immediately transferred to a flexibility-timing jig containing two rounded disc supports 2 1/2-inches apart, a cam-operated plunger weighing 2126 grams and centered over said supports, and a micrometer dial gauge. The plunger, whose motion is governed by an electrical timing device which is actuated by the opening disc mold, is released exactly 10 seconds after the mold is opened; and the distance through which the disc is deflected thereby is read from the micrometer dial gage.

"Pourability," which reflects the free-flowing quality of a molding composition as reflected by the time required for a specified weight thereof to pass through a stemless funnel of prescribed dimensions, and "apparent density" were measured by the procedures described in ASTM D–392–38.

In actual practice, the overall molding cycle of a molding material is the sum of the mold closing time and the cure time. The former, as the name implies, is the time required to close the mold completely and to attain the desired pressure therein, during which period the material flows within and completely fills the mold cavity; the latter refers to the time required by the materials within the closed mold to react (cross-link) under the influence of the heat and pressure acting thereon and to thermoset to the desired degree of infusibility, insolubility, and rigidity.

Since the cure speed proper, i.e., the in-mold reaction time of the novel furfural or furfuryl alcohol modified compositions is substantially the same as that of the "ortho" novolac resins described and claimed in the Bender et al. U.S. Patent 2,475,587, and since their improved plasticity characteristics permit the mold to be closed much faster, about twice as fast, the overall molding cycle at a given temperature is reduced in many cases. For example, in molding a relatively small piece, the mold closing time might be of the order of a second, in which case the press cycles needed for the new and old materials would be substantially the same; but in molding a large piece such as a television cabinet, the mold closing time would be for the order of 25–30 seconds for the old materials as contrasted with only about 13–15 seconds for the new compositions. Since a molding cycle reduction of even a few seconds is of real commercial value, a reduction of the indicated magnitude, i.e., about 15 seconds, is an improvement of major commercial consequence, and is particularly noteworthy since all previous improvements in molding latitude have almost invariably been accompanied by a significant reduction in molding speed brought about, as a rule, by reductions in both cure time and mold closing speeds.

Furthermore, the new furfural or furfuryl alcohol modified resin molding compositions of this invention can, in many instances, be molded satisfactorily at significantly higher temperatures than previously known molding materials based on "ortho" type novolac resin because of their much improved molding latitude; and satisfactory moldability at such higher temperatures permits shorter molding cycles because of both faster mold closing and reduced cure times.

What is claimed is:

1. A thermosetting molding composition comprising filler, a resinous novolac binder, a hardening agent for the novolac, and a furan derivative selected from the group consisting of furfural and furfuryl alcohol, said derivative constituting between about 1 and 7 percent by weight of the composition and said novolac resin binder constituting between about 20 and 68 percent by weight of the composition and containing at least 50 percent by weight thereof of a novolac methylene chained polyphenylol condensation product of phenol and formaldehyde in which a majority of the methylene groups are ortho-ortho attached to phenylol groups.

2. Composition according to claim 1 wherein the hardener is a methylene group engendering compound selected from the group consisting of hexamethylenetetramine, paraformaldehyde, ethylenediamine-formaldehyde adduct, and resole phenol-aldehyde condensation products.

3. Composition according to claim 1 wherein the hardening agent is hexamethylenetetramine and is present in amount between 0.13 and 0.29 part by weight per part of novolac resin.

4. Composition according to claim 1 wherein the hardening agent is a resole phenol-aldehyde condensation product and is present in amount between 0.3 and 1 part by weight per part of novolac resin.

5. Composition according to claim 1 wherein the furan derivative constitutes between 2.5 and 4.5 percent by weight of the composition.

6. Composition according to claim 1 wherein the composition contains between 1/2 to 10 percent by weight thereof of an alkaline modifier selected from the group consisting of the alkaline earth metal oxides and hydroxides.

7. Composition according to claim 1 wherein the furan derivative is furfural.

8. Method for forming a furan derivative containing dry molding mixture free from tacky agglomerates, which comprises mixing a furan derivative selected from the group consisting of furfural and furfuryl alcohol with an adsorbent molding material filler selected from the group consisting of wood flour, silica, silicates, and carbon black in proportions forming a dry, free-flowing powdery material, and then mixing therewith additional molding material filler, a novolac containing ortho-ortho methylene linked polyphenylols and a hardener for the novolac in proportions such that the final mixture contains from 1 to 7 percent by weight thereof of the furan derivative and from about 20 to about 68 percent by weight thereof of said novolac.

9. Method for improving the molding latitude of a thermosetting composition comprising filler, a novolac containing ortho-ortho methylene chained polyphenylols, and a hardener for said novolac which comprises mixing one volume of a furan derivative selected from the group consisting of furfural and furfuryl alcohol with at least about 2.5 volumes of wood flour to form a free flowing dry-mix and then mixing said dry mix with additional filler, the novolac and the hardener in such proportions that the final mixture contains from 1 to 7 percent by weight thereof of the furan derivative and from about 20 to about 68 percent by weight thereof of said novolac.

10. Method for improving the molding latitude of a thermosetting composition comprising filler, a novolac containing ortho-ortho methylene chained polyphenylols and a hardener for said novolac which comprises mixing a siliceous molding material filler with a furan derivative selected from the group consisting of furfural and furfuryl alcohol in proportions to form a dry, free-flowing mix and then mixing said dry mix with additional filler, the novolac, and the hardening agent in proportions such that the final composition contains from 1 to about 7 percent by weight thereof of the furan derivative and from about 20 to about 68 percent by weight thereof of said novolac.

11. Method for improving the molding latitude of a thermosetting molding composition containing a novolac having ortho-ortho methylene chained polyphenylols which comprises mixing a furan derivative selected from the group consisting of furfural and furfuryl alcohol with the novolac heated to a fluid consistency, cooling the mixture to a solid state, comminuting the solid mixture, and mixing therewith filler and a hardener for the novolac in such proportions that the final mixture contains from 1 to 7 percent by weight thereof of the furan derivative and from about 20 to about 68 percent by weight thereof of said novolac.

12. A thermosetting molding composition comprising filler, a resinous novolac binder, a hardening agent for the novolac, and a furan derivative selected from the group consisting of furfural and furfuryl alcohol, said derivative constituting between about 2.5 and 4.5 percent by weight of the composition and said novolac resin binder constituting between about 30 and 45 percent by weight of the composition and containing at least 50 percent by weight thereof of a novolac methylene chained polyphenylol condensation product of phenol and formaldehyde in which a majority of the methylene groups are ortho-ortho attached to phenylol groups.

13. Method for improving the molding latitude of a thermosetting molding composition comprising filler, a novolac containing ortho-ortho methylene chained polyphenylols and a hardener for said novolac, said novolac constituting between about 20 and 68 percent by weight of said composition, which comprises incorporating in said composition a furan derivative selected from the group consisting of furfural and furfuryl alcohol in an amount whereby the final composition contains from about 1 to about 7 percent by weight thereof of said furan derivative.

References Cited in the file of this patent

UNITED STATES PATENTS

| | | |
|---|---|---|
| 1,528,006 | Cheetham | Mar. 3, 1925 |
| 1,884,747 | Knapp | Oct. 25, 1932 |